United States Patent
Clarke

(10) Patent No.: US 10,693,807 B2
(45) Date of Patent: Jun. 23, 2020

(54) METHOD AND SYSTEM FOR MEDIATED RESOURCE ALLOCATION

(71) Applicant: CABLE TELEVISION LABORATORIES, INC, Louisville, CO (US)

(72) Inventor: Donald Clarke, Joplin, MO (US)

(73) Assignee: Cable Television Laboratories, Inc, Louisville, CO (US)

( * ) Notice: Subject to any disclaimer, the term of this patent is extended or adjusted under 35 U.S.C. 154(b) by 650 days.

(21) Appl. No.: 15/343,562

(22) Filed: Nov. 4, 2016

(65) Prior Publication Data

US 2017/0134307 A1    May 11, 2017

Related U.S. Application Data

(60) Provisional application No. 62/252,124, filed on Nov. 6, 2015.

(51) Int. Cl.
*H04L 12/911* (2013.01)
*H04L 29/08* (2006.01)

(52) U.S. Cl.
CPC ............ *H04L 47/82* (2013.01); *H04L 67/10* (2013.01); *H04L 47/781* (2013.01)

(58) Field of Classification Search
CPC ........ H04L 47/82; H04L 67/10; H04L 47/781
See application file for complete search history.

(56) References Cited

U.S. PATENT DOCUMENTS

| | | | | |
|---|---|---|---|---|
| 8,255,915 | B1* | 8/2012 | Blanding | G06F 9/5027 718/104 |
| 8,694,639 | B1* | 4/2014 | Vermeulen | G06F 9/5011 709/226 |
| 9,720,731 | B2* | 8/2017 | Dan | G06F 9/50 |
| 10,009,285 | B2* | 6/2018 | Mogul | G06F 9/50 |
| 2007/0021998 | A1* | 1/2007 | Laithwaite | G06Q 10/06 705/7.13 |
| 2013/0173597 | A1* | 7/2013 | Do | G06F 9/5011 707/722 |
| 2016/0173403 | A1* | 6/2016 | Mogul | G06F 9/50 709/226 |
| 2016/0315876 | A1* | 10/2016 | Sinha | H04L 47/828 |
| 2017/0126792 | A1* | 5/2017 | Halpern | H04L 41/0896 |
| 2017/0163493 | A1* | 6/2017 | AuYoung | H04L 12/6418 |

* cited by examiner

*Primary Examiner* — Michael A Keller
*Assistant Examiner* — Javier O Guzman
(74) *Attorney, Agent, or Firm* — Armstrong Teasdale LLP

(57) ABSTRACT

A method for mediating resource allocation includes a step of receiving from at least one first computation module, a first proposed resource allocation for completing a computational task. The method further includes a step of comparing the received first proposed resource allocation to at least one of a predetermined resource allocation criteria and at least one second proposed resource allocation received from at least one second computation module, and a step of determining a resource allocation instruction based, at least in part, on a result of the step of comparing.

15 Claims, 2 Drawing Sheets

METHOD AND SYSTEM FOR MEDIATED RESOURCE ALLOCATION

CROSS REFERENCE TO RELATED APPLICATIONS

This application claims the benefit of and priority to U.S. Provisional Patent Application Ser. No. 62/252,124, filed Nov. 6, 2015, which is incorporated herein by reference in its entirety.

BACKGROUND

The field of the disclosure relates generally to management of computer networks, and more particularly, to operations, management, and allocation of network resources within such networks.

Management of a network typically includes controlling, planning, allocating, deploying, and monitoring of resources within the network. Accordingly, networks generally include one or more management systems configured to oversee and coordinate operations within the network. Such management systems are critical to the reliability, efficiency, and performance of the network and, as a result, can result in significant losses if compromised by problems such as cyberattacks and software bugs. Left unidentified and unresolved, such problems may propagate through a network, further compromising additional network components, further exposing the network.

The potential issues and harm arising from compromised network management systems have grown with the increased size and complexity of networks and the implementation of network virtualization. Accordingly, to ensure network security and reliability, network operators are often required to place increased trust in the software and hardware deployed within their networks and, more specifically, in the vendors providing such software and hardware. Given the increased risks associated with misplacing such trust, additional methods of ensuring the reliability and security of computer networks are needed.

BRIEF SUMMARY

In an aspect, a method for mediating resource allocation includes receiving from at least one first computation module, a first proposed resource allocation for completing a computational task. The method further includes comparing the received first proposed resource allocation to at least one of a predetermined resource allocation criteria and at least one second proposed resource allocation received from at least one second computation module and determining a resource allocation instruction based, at least in part, on a result of the step of comparing.

In another aspect, a mediator for a resource allocation system of a computer network is configured to receive from at least one first computation module of the plurality of computation modules, a first proposed resource allocation for completing a computational task. The mediator is further configured to compare the received first proposed resource allocation to at least one of a predetermined resource allocation criteria and at least one second proposed resource allocation received from at least one second computation module of the plurality of computation modules and determine a resource allocation instruction based, at least in part, on a result of the step of comparing.

In yet another aspect, a resource allocation system for a computer network includes a mediator and a plurality of computation modules communicatively coupled to the mediator. The mediator is configured to receive from at least one first computation module of the plurality of computation modules, a first proposed resource allocation for completing a computational task. The mediator is further configured to compare the received first proposed resource allocation to at least one of a predetermined resource allocation criteria and at least one second proposed resource allocation received from at least one second computation module of the plurality of computation modules and determine a resource allocation instruction based, at least in part, on a result of the step of comparing.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
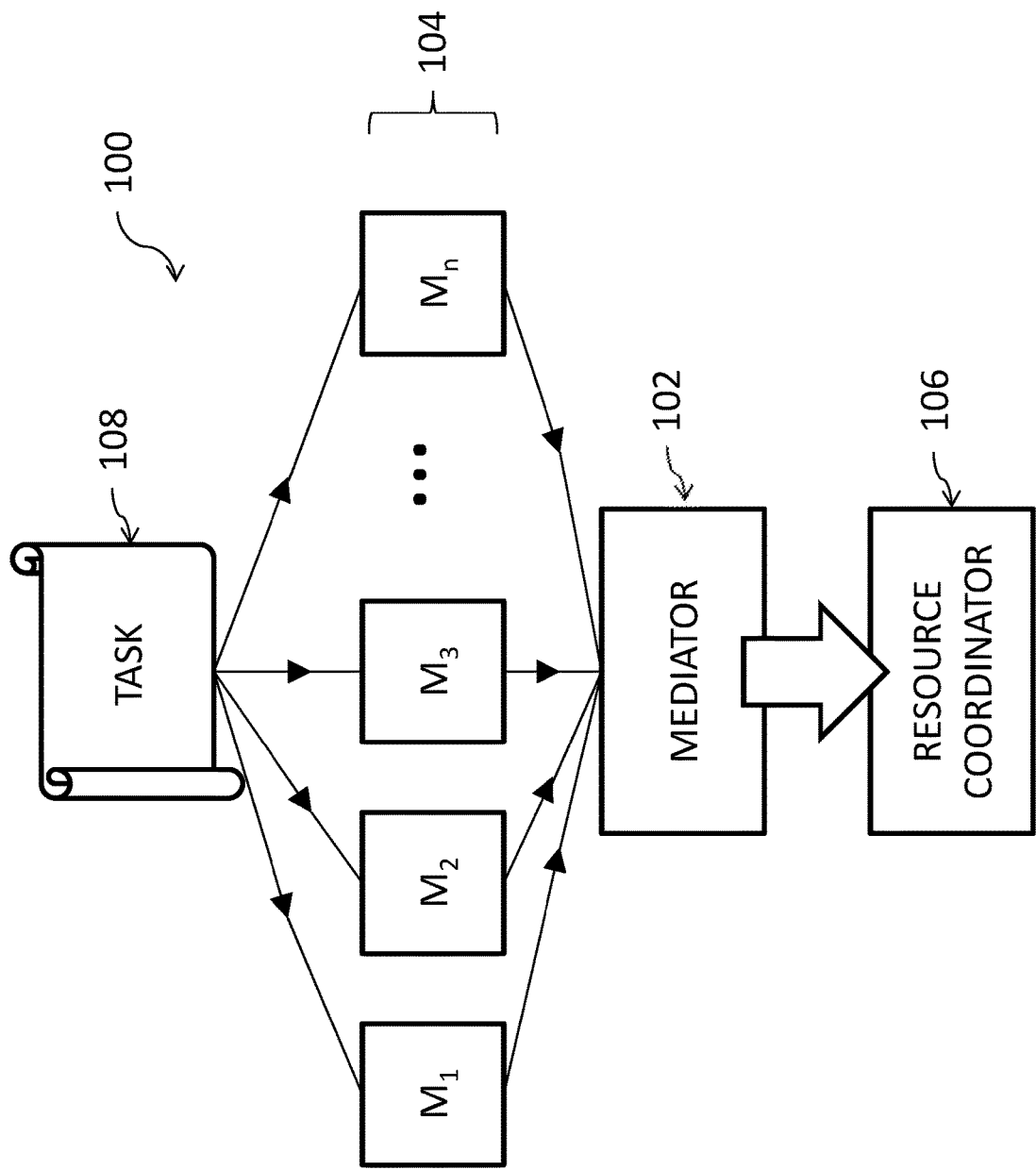
FIG. 1 is a schematic illustration of an exemplary resource allocation system.

FIG. 1 is a schematic illustration of an exemplary resource allocation system 100. Resource allocation system 100 includes a mediator 102 communicatively coupled to one or more computation modules 104, individually referenced in FIG. 1 as $M_1$ to $M_n$. Mediator 102 is further communicatively coupled to a resource coordinator 106. Each of mediator 102, computation modules 104, and resource coordinator 106 may be implemented as software, hardware, or a combination thereof.

Computation modules 104 are configured to receive a computational task 108 and, in response to receiving computational task 108, to provide to mediator 102 proposed resource allocations for completing computational task 108. Examples of computational tasks provided to computation modules 104 include, without limitation, tasks related to applying software updates, on-boarding and configuring Virtual Network Functions (VNFs) in a Network Function Virtualization Infrastructure (NFVI), management of Software Defined Networking (SDN) controllers, management of SDN routing configurations, on-boarding and configuring VNF Management (VNFM) functions, configuring Management & Orchestration (MANO) functions, management of Network Services Descriptors (NSD), block chaining of data, management of digital credentials including the implementation of Public Key Infrastructures (PKI), software license management, and software repository management.

In response to receiving one or more proposed resource allocations from computation modules 104, mediator 102 compares a received proposed resource allocation to one or more of predetermined resource allocation criteria and other received proposed resource allocations. Based on this comparison, mediator 102 determines a resource allocation instruction. In certain embodiments, mediator 102 further provides the resource allocation instruction to resource coordinator 106 to facilitate allocation of resources in accordance with the resource allocation instruction.

The comparison of the received proposed resource allocation may include one or more of: comparing the received proposed resource allocation to predetermined resource allocation criteria; and comparing the received proposed resource allocation to one or more second proposed resource allocations. For example, according to an exemplary embodiment, mediator 102 first compares a received proposed resource allocation to predetermined criteria. If the received proposed resource allocation satisfies the predetermined criteria, the received proposed resource allocation is subsequently compared to one or more second received proposed resource allocations.

In this exemplary embodiment, in which mediator 102 compares the received proposed resource allocation to predetermined resource allocation criteria, mediator 102 evaluates whether the received proposed resource allocation meets the predetermined criteria. The predetermined criteria may include one or more of: a maximum response time or range of response times for a module to provide a proposed resource allocation to mediator 102, whether certain network resources are included in or excluded from the proposed resource allocation, and whether or not an identified resource corresponds to a particular network address or range of network addresses. If mediator 102 determines the received proposed resource allocation meets the predetermined criteria, the received proposed resource allocation may be further compared to one or more second proposed resource allocations as described below in more detail. Alternatively, mediator 102 determines a resource allocation instruction by assigning the resource allocation instruction to correspond to the received proposed resource allocation. If, on the other hand, mediator 102 determines the received proposed resource allocation does not meet the predetermined criteria, mediator 102 determines the resource allocation instruction by assigning the resource allocation instruction to not correspond to the received proposed resource allocation.

In an alternative embodiment, the received proposed resource allocation is first compared to one or more second received proposed resource allocations (e.g., from different computation modules 104), mediator 102 determines the resource allocation instruction by assigning the resource allocation instruction to correspond to a majority of a proposed resource allocation set, including the received proposed resource allocation and the one or more second received proposed resource allocations. According to this example, mediator 102 assigns the resource allocation instruction to correspond to one of a substantially equal majority of the proposed resource allocation set. To the extent the received proposed resource allocation is within the majority of the proposed resource allocation set, the resource allocation instruction may be assigned to correspond to the proposed resource allocation. However, if the received proposed resource allocation is not within the majority of the proposed resource allocation set, mediator 102 may assign the resource allocation instruction such that it will not correspond to the received proposed resource allocation.

According to an exemplary embodiment, if the received proposed resource allocation does not meet the predetermined criteria, or is not within the majority of the proposed resource allocation set, mediator 102 may further initiate remedial action, including, without limitation: (a) identifying the computational module corresponding to the received proposed resource allocation as compromised; (b) generating and transmitting an alert; and/or (c) stopping operation of the network corresponding to the resource allocation in whole or in part.

Figure 2:
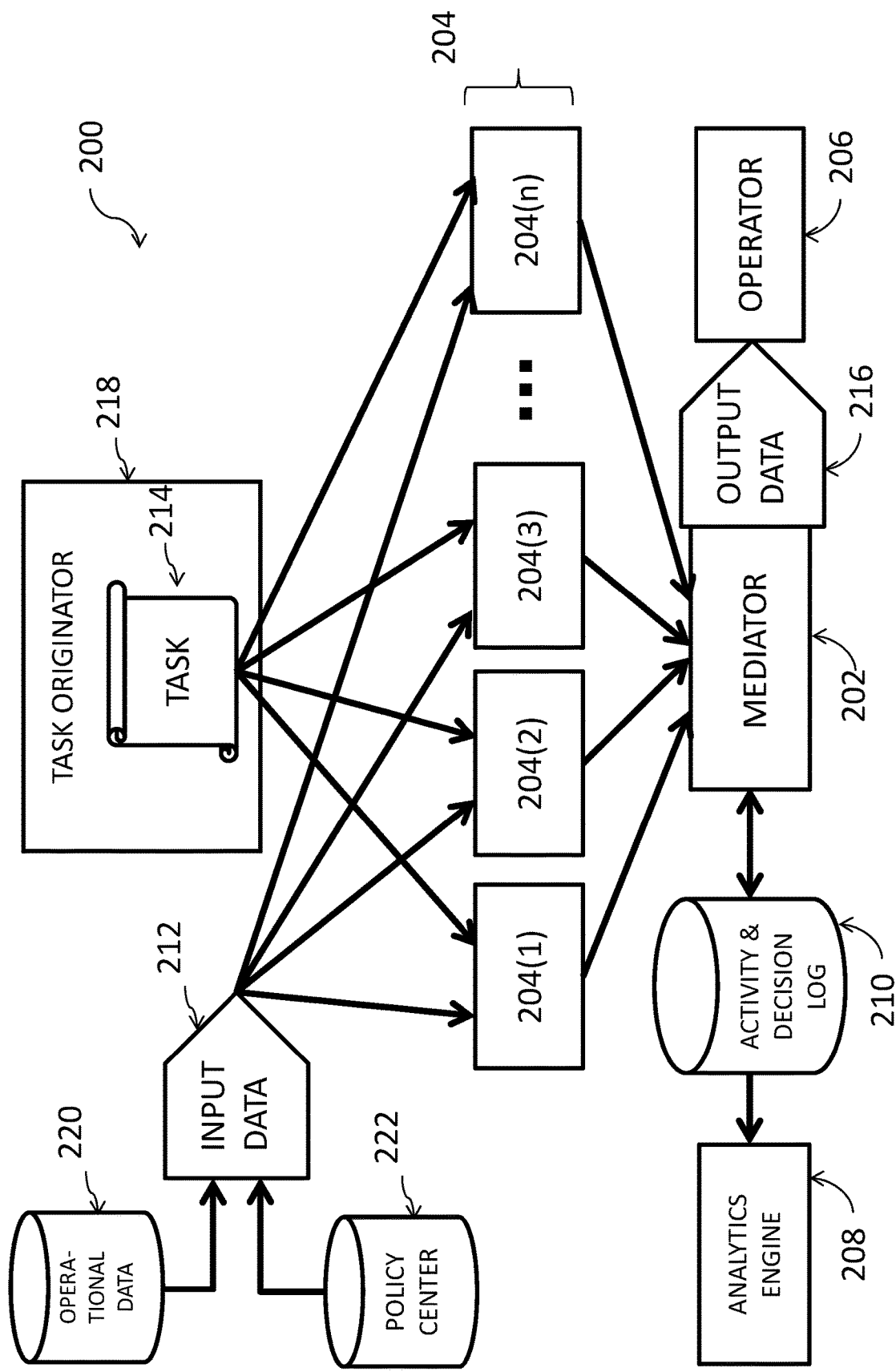
FIG. 2 is a schematic illustration of an alternative resource allocation system.

FIG. 2 is a schematic illustration of an alternative resource allocation system 200. Resource allocation system 200 is similar to resource allocation system 100, and is deployed to facilitate resource allocation within a virtualized network. In an exemplary embodiment, resource allocation system 200 corresponds to a virtualized network implemented using network functions virtualization (NFV). In an alternative embodiment, resource allocation system 200 is implemented in a virtualized network such as a software defined network (SDN).

Resource allocation system 200 includes a mediator 202 communicatively coupled to one or more computation modules 204. According to an exemplary embodiment, computation modules 204 are VNFs. In other embodiments, computation modules 204 may include, without limitation, network function virtualization (NFV) orchestrators. Computation modules 204 (VNFs) are further communicatively coupled to each of input data 212 and a task 214. Mediator 202 is further communicatively coupled to a resource coordinator/operator 206 and an activity and decision log 210. In this example, each of mediator 202, computation modules 204, and operator 206 may be implemented as software, hardware, or a combination thereof.

In operation, each of computation modules 204 receives task 214 and, in response to receiving task 214, provides a proposed resource allocation to mediator 202. Mediator 202 evaluates the received proposed resource allocations to determine output data 216. In the exemplary embodiment, output data 216 is a resource allocation instruction. After this evaluation is performed, mediator 202 transmits output data 216 to operator 206 for execution. For example, in the exemplary embodiment in which output data 216 is a resource allocation instruction, operator 206 allocates network resources in accordance with the resource allocation instruction.

According to an exemplary embodiment, resource allocation system 200 includes a plurality of computation modules 204 (VNFs), which are generally configured to perform substantially the same computational tasks as one another. In an alternative embodiment, a first subset of computation modules 204 may differ from a second subset of computation modules 204. For example, one or more of the software and hardware for implementing the first subset of computation modules 204 may differ from that of the second subset of computation modules 204. Such differences may arise when, for example, a network operator purchases and/or deploys subsets of computation modules 204 from different vendors or developers.

In the exemplary embodiment, task 214 is provided to each of computation modules 204 by a task originator 218. Task originator 218 may include, without limitation, one or more of: Operations Support Systems (OSS), Business Support Systems (BSS), service orchestrators, and Management and Orchestration (MANO) systems. According to an exemplary embodiment, tasks 214 provided by task originator 218 adhere to one or more specifications or templates including, without limitation, ETSI NFV templates such as NFV Service Catalog, VNF Catalog, NFV Instances, NFV Infrastructure, OpenStack Heat Orchestration Template (HOT) template, Amazon Stack template, and OASIS Topology and Orchestration Specification for Cloud Applications (TOSCA), and dynamic interpretation of information models such as YANG models.

After receiving a computational task, each computation module 204 provides a proposed resource allocation for completing the computational task to mediator 202. The proposed resource allocation includes procedures specifying the allocation of resources including, without limitation, computing processes, storage, network connections, and other network resources.

Each of computation modules 204 is configured to receive input data 212. Input data 212 generally includes data for facilitating generation of proposed resource allocations by computation modules 204. Input data 212 may include, without limitation, historical data corresponding to previous tasks and details regarding network resources. In certain embodiments, input data 212 includes real-time operational data 220. For example, operator 206 may provide or otherwise make available to computation modules 204 operational data corresponding to one or more network resources relevant to computational tasks received by computation modules 204.

In certain embodiments, input data 212 may include prescriptive task specifications. A prescriptive task specification may include, without limitation, one or more of rules, logic, criteria, and other parameters to be applied by computation modules 204 to determine proposed resource allocations for performing specific tasks. Input data 212 including prescriptive task specifications may be provided by a policy center 222 configured to store prescriptive task specifications and to distribute or otherwise make the prescriptive task specifications available to computation modules 204 (VNFs).

In operation, according to an exemplary embodiment, a virtual machine within a network function is to be assigned a physical host. Task originator 218, for example, sends computational task 214, which may be a placement task, to each of computation modules 204. Based on corresponding prescriptive task specifications received as input data 212 from policy center 222, each of computation modules 204 provides a proposed resource allocation for completing placement task 214 to mediator 202. For example, the prescriptive task specifications stored in policy center 222 and implemented by computation modules 204 may include, without limitation, rules, logic, criteria, and other parameters corresponding to business policies and/or network resource use policies. Mediator 202 evaluates the received proposed resource allocations and issues output data 216 including a resource allocation instruction to operator 206 for execution.

According to an exemplary embodiment, mediator 202 is communicatively coupled to an activity and decision log 210. During operation, mediator 202 transmits data to activity and decision log 210 for storage, processing, and analysis. Data transmitted from mediator 202 to activity and decision log 210 includes, without limitation, computational task details, proposed resource allocations received from computation modules 204, resource allocation instructions determined by mediator 202, and other output data 216 generated by mediator 202. In this example, an analytic engine 208 is further communicatively coupled to activity and decision log 210, and serves to analyze data stored in activity and decision log 210 to identify patterns within the stored data and temporal anomalies, such as unexpected changes in latency, which may indicate that one of computation modules 204 has been compromised.

In an exemplary embodiment, analytic engine 208 performs forensic analysis when mediator 202 receives a proposed resource allocation from one of computation modules 204 that does not meet predetermined criteria, and/or which may be inconsistent with other received proposed allocations. In this example, such forensic analysis includes analysis of historical data received from the potentially compromised computation module 204 to determine when deviations from the predetermined criteria and/or other computational modules began. According to an embodiment, analytic engine 208 may also be configured to analyze the performance of computation modules 204 with respect to a variety of computational tasks over a sustained period of time. According to an alternative embodiment, analytic engine 208 is further configured to generate and transmit alerts in response to identifying patterns, such as those indicative of a security compromise, in data (not separately numbered) stored in activity and decision log 210.

According to the present disclosure, utilization of a mediator (e.g., mediator 202) for assessing resource allocation decisions by computation modules (e.g., computation modules 204) within a network improves the security and reliability of the network. More specifically, the present systems and methods solve a problem of identifying compromised computational modules within a network while preventing the cause of the compromise (e.g., a cyberattack, a software bug, etc.) from propagating through the network. The present systems and methods achieve such advantageous results by implementing a mediator that receives proposed resource allocations from computation module, compares the proposed resource allocations with one or more of predetermined resource allocation criteria and other received proposed resource allocations, and determines a resource allocation instruction based on the comparison. Such processing facilitates ready identification of compromised computation modules within the network and the initiation of subsequent remedial measures.

Additionally, placement of the mediator between the computation module and a resource coordinator or operator serves to further ensure that resource allocation instructions from a compromised computational module do not reach the resource coordinator. By evaluating proposed resource allocations from one or more computation modules, and separately determining a resource allocation instruction based on a comparison of proposed allocations, the mediator is further capable of verifying that the resource coordinator receives only resource allocation instructions that meet the predetermined criteria, or are substantially consistent with other proposed resource allocations received from other computation modules. As a result, the propagation of faults within the network is significantly reduced. Moreover, the network utilizing systems and methods according to the present disclosure, is further capable of continuing to function securely and reliably even in the event that one or more computation modules is compromised.

Exemplary embodiments of resource allocation systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for mediating resource allocation within a virtualized network of a computer network, the method comprising the steps of:
    receiving from at least one first computation module configured for virtual network functions in a network function virtualization infrastructure of the virtualized network, a first proposed resource allocation for completing a computational task;
    comparing the received first proposed resource allocation to at least one of a predetermined resource allocation criteria and at least one second proposed resource allocation received from at least one second computation module;
    determining a resource allocation instruction based, at least in part, on a result of the step of comparing;
    identifying that the at least one first computation module is compromised; and
    allocating one or more network resources in accordance with the resource allocation instruction,
    wherein the step of identifying comprises a substep of analyzing data stored in an activity and decision log indicating at least one of a temporal anomaly, a security compromise, and an unexpected change in latency,
    wherein the step of comparing comprises comparing the received first proposed resource allocation to at least one second received proposed resource allocation to ascertain whether the received first proposed resource allocation is substantially equal to a majority of a proposed resource allocation set including the received first proposed resource allocation and the one or more second received proposed resource allocations,
    wherein the step of comparing ascertains that the received first proposed resource allocation is not substantially equal to the majority of the proposed resource allocation set, and
    wherein the step of determining comprises assigning the resource allocation instruction to correspond with at least one proposed resource allocation of the proposed resource allocation set that is not the first proposed resource allocation.

2. The method of claim 1, further comprising the step of providing the computational task to the at least one first computation module.

3. The method of claim 1,
    wherein the step of comparing comprises comparing the received first proposed resource allocation to a predetermined resource allocation criteria, and
    wherein the step of determining comprises substeps of:
        evaluating that the first proposed resource allocation meets the predetermined resource allocation criteria, and
        assigning the resource allocation instruction to correspond with the received first proposed resource allocation.

4. The method of claim 1,
    wherein the step of comparing comprises comparing the received first proposed resource allocation to a predetermined resource allocation criteria, and
    wherein the step of determining comprises substeps of:
        evaluating that the proposed resource allocation does not meet the predetermined resource allocation criteria, and
        assigning the resource allocation instruction to not correspond with the received first proposed resource allocation.

5. The method of claim 1,
    wherein the step of determining comprises assigning the resource allocation instruction to correspond with the majority of the proposed resource allocation set.

6. The method of claim 5, wherein the step of determining comprises assigning the resource allocation instruction to correspond with at least one proposed resource allocation of the majority of the proposed resource allocation set.

7. The method of claim 1, wherein the first proposed resource allocation is for the virtualized network.

8. The method of claim 1, further comprising the step of logging at least one of task data corresponding to the computational task and proposed resource allocation data corresponding to at least one of the received first proposed resource allocation and the at least one received second proposed resource allocation.

9. The method of claim 8, further comprising the steps of:
analyzing the logged proposed resource allocation to identify at least one pattern indicating that a computational module is compromised; and
generating an alert in response to the identification of the at least one pattern.

10. The method of claim 8, further comprising the step of analyzing the logged proposed resource allocation data to identify at least one pattern indicating the first computation module is compromised by a performance trend of the first computational module.

11. A mediator for a resource allocation system of a computer network including a network virtualization infrastructure having a software defined network (SDN), the mediator in operable communication with a processor and a memory device and configured to:
receive from at least one first computation module of a plurality of computation modules, a first proposed resource allocation for completing a computational task, wherein each computation module of the plurality of computation modules is (i) at least one of a virtual network function module (VNF) and a network function virtualization (NFV) orchestrator for the network virtualization infrastructure, and (ii) configured for operation within the SDN;
compare the received first proposed resource allocation to at least one of a predetermined resource allocation criteria and at least one second proposed resource allocation received from at least one second computation module of the plurality of computation modules; and
determine a resource allocation instruction based, at least in part, on a result of the step of comparing;
identify that the at least one first computation module is compromised; and
allocate one or more network resources in accordance with the resource allocation instruction,
wherein the mediator is further configured to, when identifying that the at least one first computation module is compromised, analyze data stored in an activity and decision log indicating at least one of a temporal anomaly, a security compromise, and an unexpected change in latency,
wherein the comparison of the received first proposed resource allocation to at least one second received proposed resource allocation ascertains (i) whether the received first proposed resource allocation is substantially equal to a majority of a proposed resource allocation set including the received first proposed resource allocation and the one or more second received proposed resource allocations, and (ii) that the received first proposed resource allocation is not substantially equal to the majority of the proposed resource allocation set, and
wherein the determination of the resource allocation instruction comprises an assignment of the resource allocation instruction to correspond with at least one proposed resource allocation of the proposed resource allocation set that is not the first proposed resource allocation.

12. The mediator of claim 11, wherein the mediator is further configured to:
compare the received first proposed resource allocation to a predetermined resource allocation criteria, and
determine the resource allocation instruction by:
evaluating that the proposed resource allocation meets the predetermined resource allocation criteria, and
assigning the resource allocation instruction to correspond with the received first proposed resource allocation.

13. The mediator of claim 11, wherein the mediator is further configured to:
compare the received first proposed resource to at least one second received proposed resource allocation to ascertain whether the received first proposed resource allocation is substantially equal to a majority of a proposed resource allocation set including the first received proposed resource allocation and the one or more second received proposed resource allocations, and
determine the resource allocation instruction by assigning the resource allocation instruction to correspond with the majority of the proposed resource allocation set.

14. The mediator of claim 11, wherein the mediator is further configured to log at least one of task data corresponding to the computational task, and proposed resource allocation data corresponding to at least one of the received first proposed resource allocation and the at least one received second proposed resource allocation.

15. A resource allocation system for a computer network configured for network function virtualization, the resource allocation system comprising:
a mediator; and
a plurality of computation modules communicatively coupled to the mediator,
wherein the mediator is configured to:
receive from at least one first computation module of the plurality of computation modules, a first proposed resource allocation for completing a computational task;
compare the received first proposed resource allocation to at least one of a predetermined resource allocation criteria and at least one second proposed resource allocation received from at least one second computation module of the plurality of computation modules;
determine a resource allocation instruction based, at least in part, on a result of the step of comparing;
identify that the at least one first computation module is compromised; and
allocate one or more network resources in accordance with the resource allocation instruction,
wherein the mediator is further configured to, when identifying that the at least one first computation module is compromised, analyze data stored in an activity and decision log indicating at least one of a temporal anomaly, a security compromise, and an unexpected change in latency,
wherein the comparison of the received first proposed resource allocation to at least one second received proposed resource allocation ascertains (i) whether the received first proposed resource allocation is substantially equal to a majority of a proposed resource allocation set including the received first proposed resource allocation and the one or more second received proposed resource allocations, and (ii) that the received first proposed resource allocation is not substantially equal to the majority of the proposed resource allocation set, and
wherein the determination of the resource allocation instruction comprises an assignment of the resource allocation instruction to correspond with at least one proposed resource allocation of the proposed resource allocation set that is not the first proposed resource allocation.

\* \* \* \* \*